(12) United States Patent
Igarashi et al.

(10) Patent No.: US 12,049,127 B1
(45) Date of Patent: Jul. 30, 2024

(54) DEFLECTOR STRUCTURE FOR SUNROOF DEVICE

(71) Applicant: YACHIYO INDUSTRY CO., LTD., Sayama (JP)

(72) Inventors: Mamoru Igarashi, Tochigi (JP); Moto Kikuchi, Tochigi (JP)

(73) Assignee: YACHIYO INDUSTRY CO., LTD., Sayama (JP)

( * ) Notice: Subject to any disclaimer, the term of this patent is extended or adjusted under 35 U.S.C. 154(b) by 0 days.

(21) Appl. No.: 18/563,479

(22) PCT Filed: Mar. 11, 2022

(86) PCT No.: PCT/JP2022/010876
§ 371 (c)(1),
(2) Date: Nov. 22, 2023

(87) PCT Pub. No.: WO2022/249646
PCT Pub. Date: Dec. 1, 2022

(30) Foreign Application Priority Data

May 25, 2021 (JP) .................................. 2021-087376

(51) Int. Cl.
*B60J 7/22* (2006.01)
(52) U.S. Cl.
CPC ...................................... *B60J 7/22* (2013.01)
(58) Field of Classification Search
CPC ....................................................... B60J 7/22
USPC ....................................................... 296/217
See application file for complete search history.

(56) References Cited

U.S. PATENT DOCUMENTS

| 8,191,962 | B2 | 6/2012 | Katayama |
| 8,246,110 | B2 | 8/2012 | Katayama et al. |
| 2013/0285418 | A1 | 10/2013 | Katayama et al. |

FOREIGN PATENT DOCUMENTS

| DE | 102007045342 | 4/2009 |
| JP | 2000085367 | 3/2000 |
| JP | 2008247092 | 10/2008 |
| JP | 2008279864 | 11/2008 |
| JP | 2010221966 | 10/2010 |

(Continued)

OTHER PUBLICATIONS

Chinese Office Action (with English translation) for corresponding Application No. CN 202280036826.6, dated Feb. 29, 2024, 7 pages.

(Continued)

*Primary Examiner* — Dennis H Pedder
(74) *Attorney, Agent, or Firm* — Dority & Manning, P.A.

(57) ABSTRACT

A deflector structure for a sunroof device includes a sunroof frame and a deflector. The sunroof frame includes a pair of side members extending along both side edges of an opening formed in a fixed roof and a front member that is made of resin and extends along a front edge of the opening. The deflector includes a blade provided along the front edge of the opening 2 and a pair of arms extending rearward from both side portions of the blade and configured to cause the blade to protrude from and retract into the opening along with a sliding movement of a slide panel. Each arm includes a rear end supported by the sunroof frame to be movable in a front-rear direction and a cam pin formed in an intermediate portion in a longitudinal direction. A cam groove for guiding each cam pin is formed in the front member.

7 Claims, 6 Drawing Sheets

(56) References Cited

FOREIGN PATENT DOCUMENTS

JP   2011168149   9/2011

OTHER PUBLICATIONS

PCT International Preliminary Report on Patentability (w English translation) for corresponding PCT Application No. PCT/JP2022/010876, completed Sep. 29, 2022, 6 pages.
PCT International Search Report (with English translation) for corresponding PCT Application No. PCT/JP2022/010876, mailed May 24, 2022, 5 pages.

DEFLECTOR STRUCTURE FOR SUNROOF DEVICE

CROSS REFERENCE TO RELATED APPLICATIONS

This application is the U.S. National Stage entry of International Application No. PCT/JP2022/010876, filed on Mar. 11, 2022, which, in turn, claims priority to Japanese Patent Application No. 2021-087376, filed on May 25, 2021, both of which are hereby incorporated herein by reference in their entireties for all purposes.

TECHNICAL FIELD

The present disclosure relates to a deflector structure for a sunroof device.

BACKGROUND ART

A sunroof device is provided with a deflector which, when an opening of a fixed roof is opened by sliding movement of a movable roof panel, causes a blade provided along the front edge of the opening to protrude upward from the opening. As such a deflector, there is known a deflector in which a pair of arms provided to extend rearward from both end portions of the blade moves the blade up/down when moved in the front-rear direction (Patent Document 1). In this deflector, a support pin is provided on the rear end of each arm, and a cam pin is provided on a part of the arm forward of the support pin. The cam pin is guided by a cam groove extending upward and frontward, and the support pin is supported by a support groove extending along the front-rear direction. The support groove is formed by a groove of a guide frame provided to extend in the front-rear direction below a side edge of the opening to support the roof panel to be movable in the front-rear direction.

PRIOR ART DOCUMENT(S)

Patent Document(s)

Patent Document 1: JP2010-221966A

SUMMARY OF THE INVENTION

Task to be Accomplished by the Invention

However, in the conventional deflector, the cam groove and the support groove are formed in a base member, which is a separate member from the guide frame, and this base member is mounted to the guide frame, whereby the guide frame is provided with the cam groove and the support groove. In the case where such a separate member is mounted to the guide frame, not only mounting work is necessary but also dimension management of these members is necessary. Therefore, the manufacturing cost of the deflector increases.

In view of the foregoing background, an object of the present invention is to provide a deflector structure for a sunroof device which can reduce the number of work steps and can facilitate dimension management.

Means to Accomplish the Task

To achieve the above object, one embodiment of the present invention is a deflector structure for a sunroof device (5), comprising: a sunroof frame (6) including a pair of side members (8) that extend along both side edges of an opening (2) formed in a fixed roof (3) and a front member (9) that is made of resin and extends along a front edge of the opening to connect front ends of the side members to each other; and a deflector (20) including a blade (21) provided along the front edge of the opening and a pair of arms (22) extending rearward from both side portions of the blade and configured to cause the blade to protrude from and retract into the opening along with a sliding movement of a slide panel (4) for opening and closing the opening, wherein each arm includes a rear end (22b) supported by the sunroof frame to be movable in a front-rear direction and a cam pin (33) formed in an intermediate portion in a longitudinal direction, and a cam groove (38) for guiding each cam pin is formed in the front member.

According to this aspect, since the cam groove for guiding the cam pin is formed in the front member, there is no need to mount another member for forming the cam groove to the side member. In other words, mounting work of another member is unnecessary, and dimension management of another member in the mounted state is also unnecessary.

Note that since the rear end of the arm is supported to be movable in the front-rear direction and the cam pin moves along the cam groove, the movement trajectory of the arm is uniquely determined. And, when the arm causes the blade to protrude from and retract into the opening along with the sliding movement of the slide panel, the rear end of the arm moves in the front-rear direction. Since the rear end of the arm moves in the front-rear direction, it is possible to cause the blade to protrude from and retract into the opening along a near-vertical trajectory without making the arm long.

In the above aspect, preferably, a support groove (23) for supporting the rear end of each arm is formed in the front member.

According to this aspect, there is no need to mount another member to the side member in order to form the support groove. Thus, mounting work of another member is unnecessary, and dimension management of another member in the mounted state is also unnecessary.

In the above aspect, preferably, each side member is mounted to an upper surface of the front member so as to overlap with the front member in plan view, and a through hole (24) or a notch vertically penetrating the side member is formed in a front portion of the side member, and when the deflector is in a deployed state in which the blade protrudes upward from the opening, the arm extends through the through hole or the notch to above the side member.

According to this aspect, the front end of the side member can be extended forward of the rear end of the arm. Thereby, an increase in size of the front member can be suppressed.

In the above aspect, preferably, the support groove is disposed rearward of the through hole or the notch.

According to this aspect, since the side member is present above the support groove, the support stiffness of the arm by the support groove can be improved.

In the above aspect, preferably, the cam groove is disposed in a position aligned with the through hole or the notch in plan view, and an upper end of the cam groove is opened.

According to this aspect, the arms can be easily assembled with the front member in a state in which the side members are assembled with the front member.

In the above aspect, preferably, a pair of guide walls (39) defining the cam groove is disposed in a position lower than a lower surface of a part of the side member around the through hole or the notch.

According to this aspect, the guide walls do not protrude upward from the through hole or the notch of the side member, and therefore, the guide walls do not interfere with the slider supporting the slide panel. Thus, the slider can be disposed forward of the rear edge of the through hole or the notch, and the support stiffness of the slide panel can be improved.

In the above aspect, preferably, the support groove is opened rearward below the side member.

According to this aspect, when molding the front member with resin, it is easy to release the front member from the mold. Therefore, the manufacturing cost of the front member can be reduced.

Effect of the Invention

According to the foregoing aspect, it is possible to provide a deflector structure for a sunroof device which can facilitate dimension management and can reduce the number of work steps.

MODE(S) FOR CARRYING OUT THE INVENTION

In the following, an embodiment of the present invention will be described in detail with reference to the drawings. Note that in the following description, the front-rear direction and the lateral direction (vehicle width direction) are defined based on the travel direction of the vehicle to which the present invention is applied.

Figure 1:
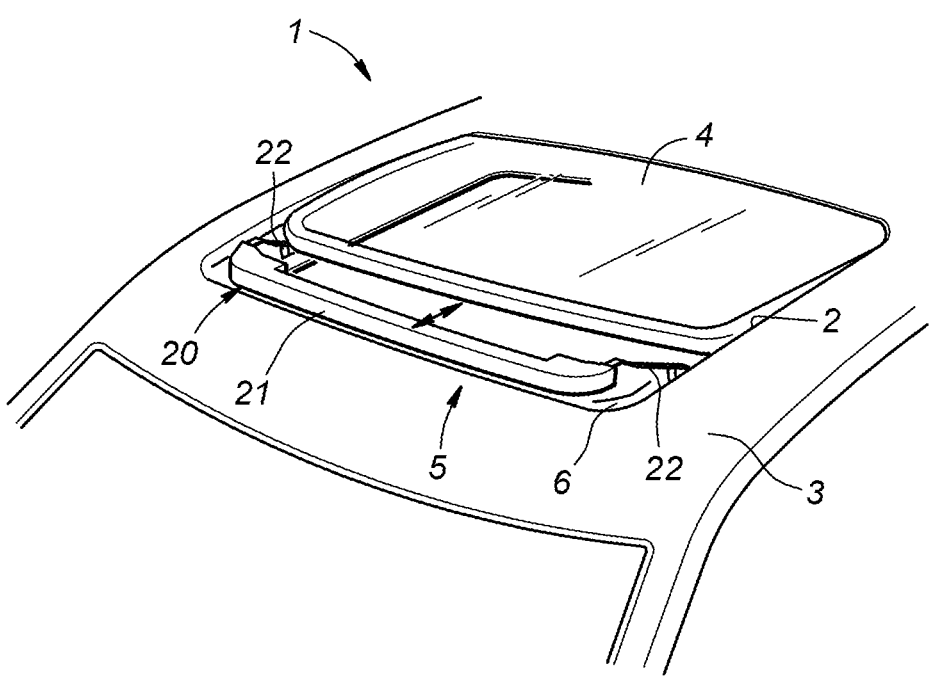
FIG. 1 is a perspective view of an automobile roof to which a deflector according to an embodiment is installed.

FIG. 1 is a perspective view of an automobile roof 1 to which a deflector 20 according to an embodiment is installed. As shown in FIG. 1, the automobile roof 1 includes a fixed roof 3 having a substantially rectangular opening 2 formed in a front portion thereof and a sunroof device 5 configured to selectively open and close the opening 2 with a slide panel 4. The slide panel 4 is provided to be slidable in the front-rear direction relative to the fixed roof 3, and opens the opening 2 by sliding rearward and closes the opening 2 by sliding forward. The sunroof device 5 has a bilaterally symmetrical structure. In the following, description will be made of the left side structure of the sunroof device 5, and the description of the right side structure will be omitted.

Figure 2:
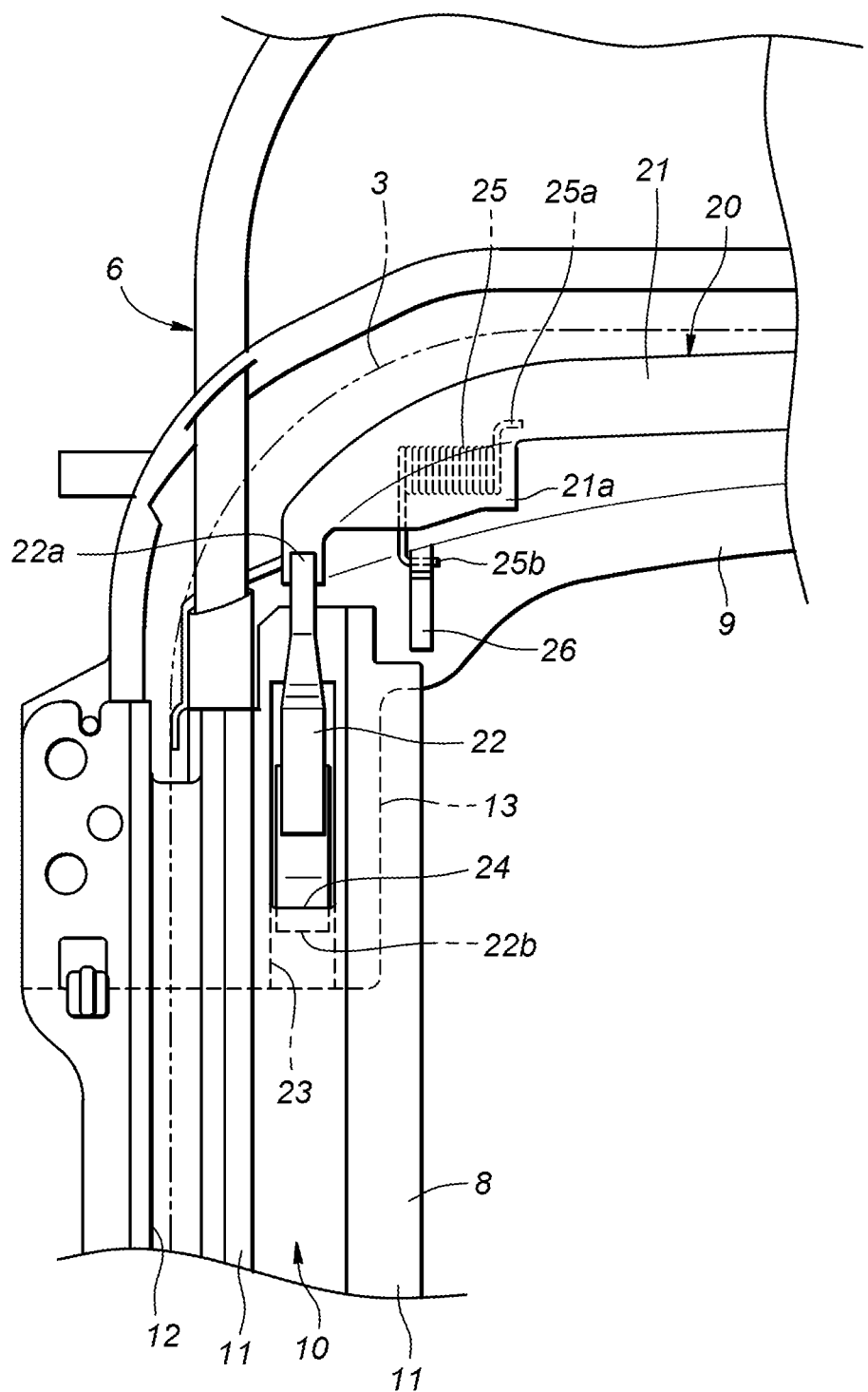
FIG. 2 is a plan view of a left front portion of a sunroof device.

FIG. 2 is a plan view of a left front portion of the sunroof device 5. As shown in FIG. 2 also, a sunroof frame 6 for slidably supporting the slide panel 4 is disposed below the fixed roof 3 (on the cabin side). The sunroof frame 6 includes a pair of side members 8, a front member 9, and a middle cross member. The side members 8 extend in the front-rear direction along the both side edges of the opening 2. The side members 8 consist of extrusion molded products of aluminum alloy, for example. The front member 9 extends in the lateral direction along the front edge of the opening 2 and connects the front ends of the pair of side members 8 to each other. The front member 9 consists of an injection molded product of resin, for example. The middle cross member extends in the lateral direction along the rear edge of the opening 2 and connects intermediate portions of the pair of side members 8 in the front-rear direction to each other. The middle cross member consists of a press molded product of a steel plate, for example.

An inner side of the side member 8 in the vehicle width direction is formed with a guide rail 10 for guiding a slider supporting the slide panel 4. The guide rail 10 is configured by a pair of channel-shaped parts 11 extending in the front-rear direction and disposed such that their open ends oppose each other. An outer side of the side member 8 in the vehicle width direction is formed with a drainage groove 12. The drainage groove 12 is disposed below a side edge of the opening 2 of the fixed roof 3. An end portion of the front member 9 in the lateral direction is integrally formed with an extension part 13 that extends rearward. The side member 8 is disposed such that the front portion thereof is positioned above and overlaps with the extension part 13 in plan view, and the side member 8 is fixed to the front member 9 by an appropriate joining means.

The sunroof device 5 is an inner slide type, in which the slide panel 4 is tilted down from a closed position where the slide panel 4 fully closes the opening 2, and is caused to slide rearward between the fixed roof 3 and the roof lining. On both side portions of the lower surface of the slide panel 4, a pair of support stays extending in the front-rear direction is fixedly provided. The slide panel 4 are supported by front sliders and rear sliders engaged with the support stays, and undergoes a tilt operation and a sliding movement when the rear sliders are slidingly driven in the front-rear direction along the guide rails 10. The driving mechanism of the slide panel 4 may be a known one, and the detailed description thereof is omitted here.

The sunroof device 5 is configured as a unit formed by assembling the slide panel 4 with the sunroof frame 6, and is installed in the roof 1 with the sunroof frame 6 being fixed to the fixed roof 3.

In the front portion of the opening 2, a deflector 20 is provided to prevent wind throb which occurs due to turbulence in outside air flow along the fixed roof 3 when the opening 2 is opened. The deflector 20 includes a blade 21 serving as a rectifier plate provided along the front edge of the opening 2 and a pair of arms 22 which extend rearward from both side portions of the blade 21 and cause the blade 21 to protrude from and retract into the opening 2 along with the sliding movement of the slide panel 4. Each arm 22 is coupled to the blade 21 at a front end 22a thereof. The deflector 20 is assembled with the sunroof device 5 such that the rear ends 22b of the pair of arms 22 are supported by the sunroof frame 6. When the sunroof device 5 is installed in the roof 1, the blade 21 of the deflector 20 is disposed along the front edge of the opening 2.

Figure 3:
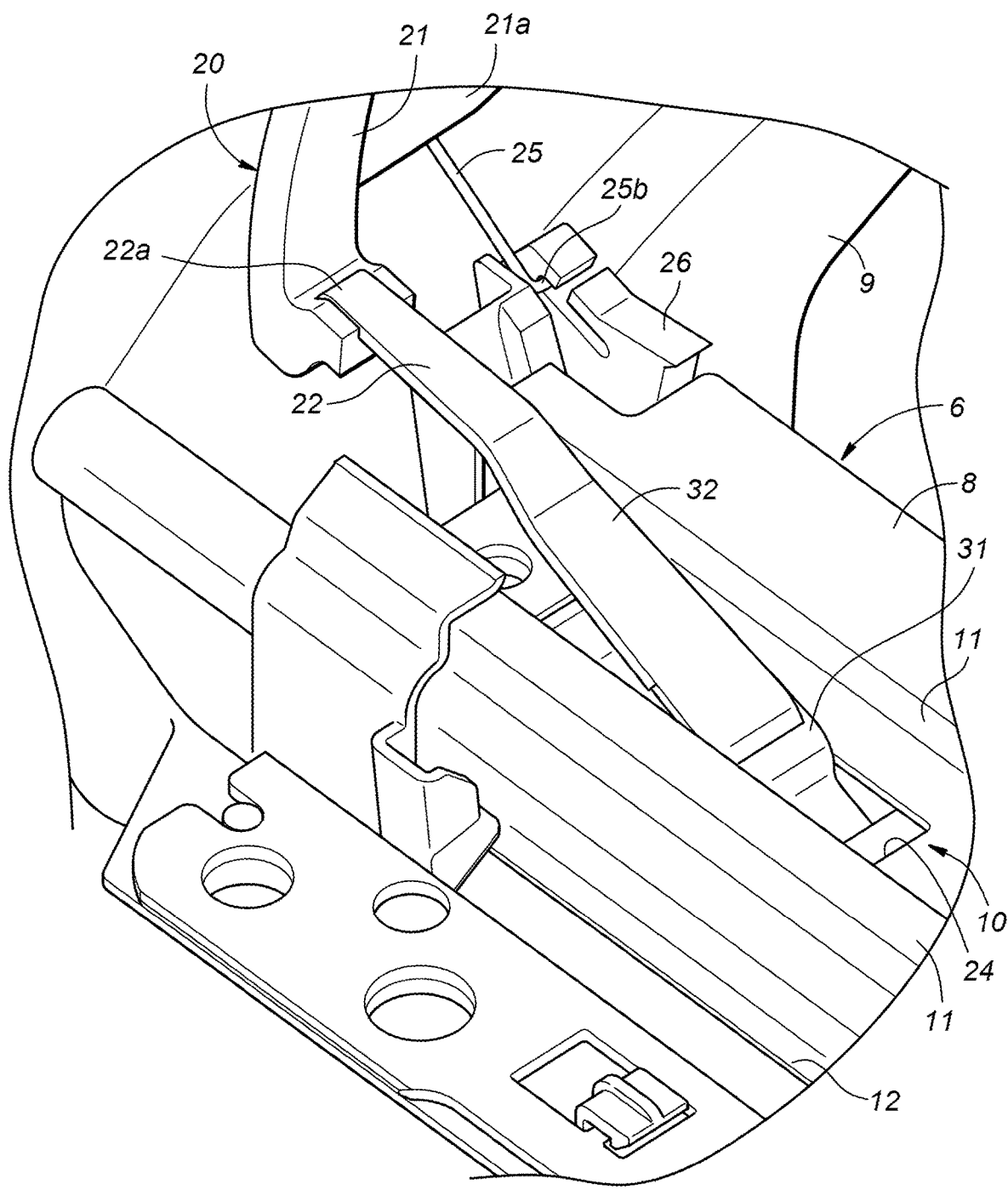
FIG. 3 is a perspective view of the left front portion of the sunroof device.

FIG. 3 is a perspective view of a left portion of the deflector 20. As shown in FIGS. 2 and 3, the front member 9 of the sunroof frame 6 is formed with a support groove 23 for supporting the rear end 22b of the arm 22. The support groove 23 is formed in the extension part 13 of the front member 9 and is opened forward. A front part of the side member 8 of the sunroof frame 6 in a position aligned with the rear portion of the arm 22 is formed with a through hole 24 penetrating the side member 8 in the up-down direction.

The through hole 24 is formed in a position aligned with the guide rail 10 in the vehicle width direction (between the pair of channel-shaped parts 11). A large part of the through hole 24 is positioned forward of the support groove 23, and a large part of the support groove 23 is positioned below the guide rail 10. The arm 22 extends obliquely forward and upward from the rear end 22b and passes through the through hole 24 to place the blade 21 coupled to the front end 22a above the front member 9 of the sunroof frame 6. The rear end 22b of the arm 22 is disposed in the support groove 23, whereby the arm 22 is supported by the front member 9 to be slidable in the front-rear direction.

The blade 21 is an injection molded product of resin and has a bow shape convex that is convex forward. In the vicinity of an end portion of the blade 21, an eave part 21a extending rearward is integrally formed. Below the eave part 21a, a torsion coil spring 25 is disposed as an urging member for always urging the blade 21 upward. The torsion coil spring 25 is held on the blade 21 such that an axis of the coil part thereof is directed in the lateral direction, and is covered from above by the eave part 21a. One end 25a of the torsion coil spring 25 is locked to the blade 21, and the other end 25b of the torsion coil spring 25 is engaged with a spring locking part 26 integrally formed in the front member 9. The torsion coil spring 25 directly urges the blade 21 upward by exerting a downward force on the sunroof frame 6 at the other end 25b.

Figure 4:
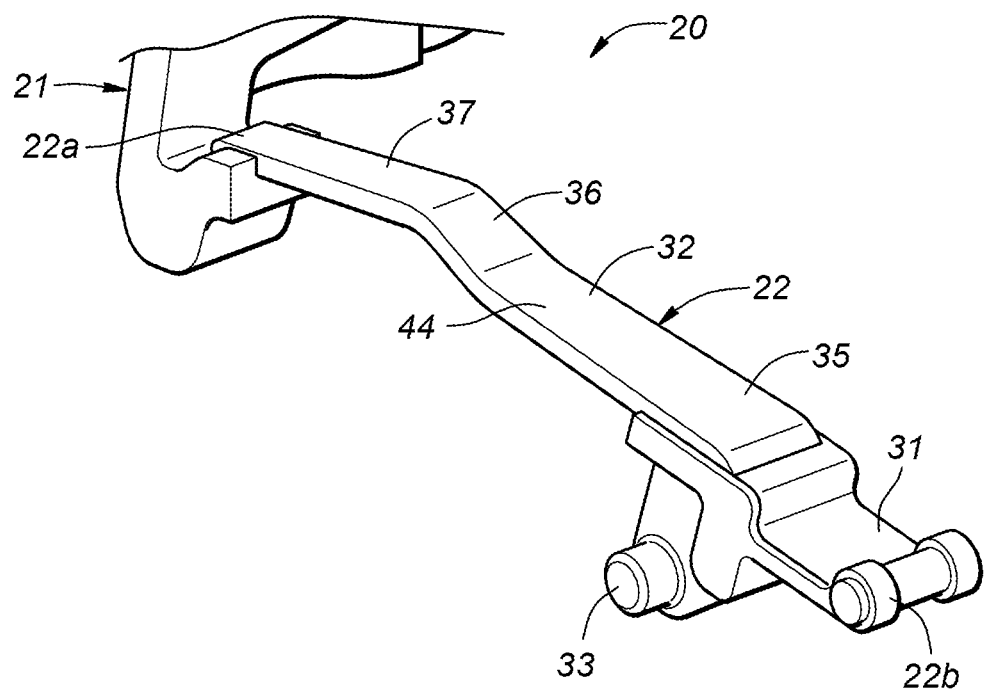
FIG. 4 is a perspective view of a left part of the deflector.

FIG. 4 is a perspective view of the arm 22. As shown in FIG. 4, the arm 22 is configured by a first member 31 made of resin and a second member 32 made of sheet metal. The rear end of the first member 31 forms the rear end 22b of the arm 22. In order to be supported by the front member 9 to be movable in the front-rear direction and to be pivotable, the rear end 22b of the arm 22 has a cylindrical columnar shape with an axis extending in the lateral direction. The first member 31 is fixed to a rear portion of the second member 32. The first member 31 may be joined to the rear portion of the second member 32 after molding or may be formed integrally with the rear portion of the second member 32 by outsert molding. The front end of the first member 31 forms an intermediate portion of the arm 22 in the longitudinal direction, and a lower portion thereof is integrally formed with a cam pin 33 so as to protrude laterally (in the present embodiment, outward in the vehicle width direction). The cam pin 33 has a cylindrical columnar shape with an axis extending in the lateral direction and is disposed below the second member 32.

The second member 32 is supported by the first member 31 in a posture in which the thickness direction of the sheet metal is directed in the up-down direction and the cross-sectional shape is long in the lateral direction. The second member 32 includes a rear plate part 35 extending forward from the rear end beyond the front end of the first member 31, an intermediate plate part 36 extending obliquely upward from the front end of the rear plate part 35, and a front plate part 37 extending forward from the front end of the intermediate plate part 36 more downward compared to the rear plate part 35. The front end of the second member 32 forms the front end 22a of the arm 22.

Figure 5:
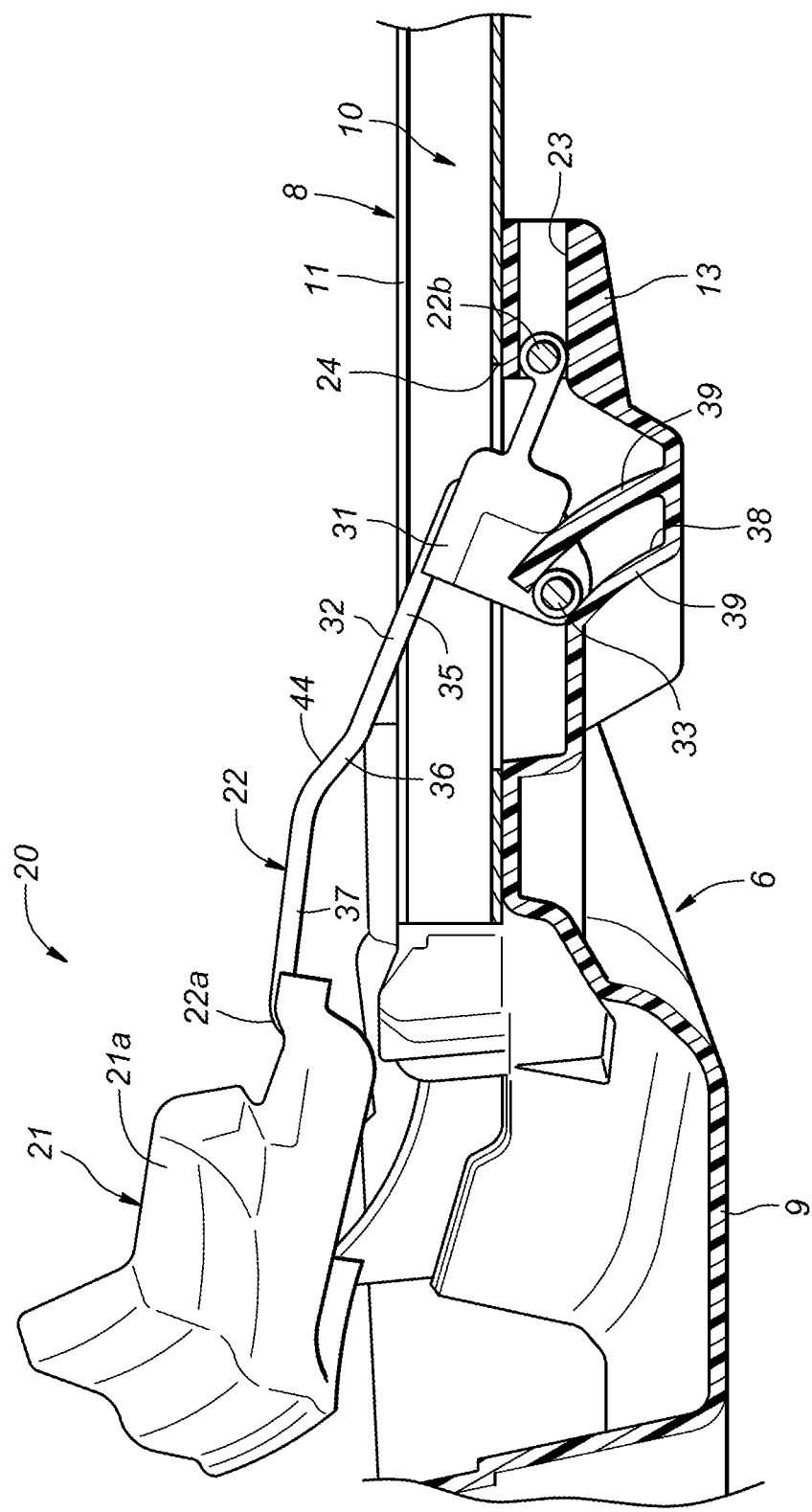
FIG. 5 is a side sectional view showing a deployed state of the deflector.
Figure 6:
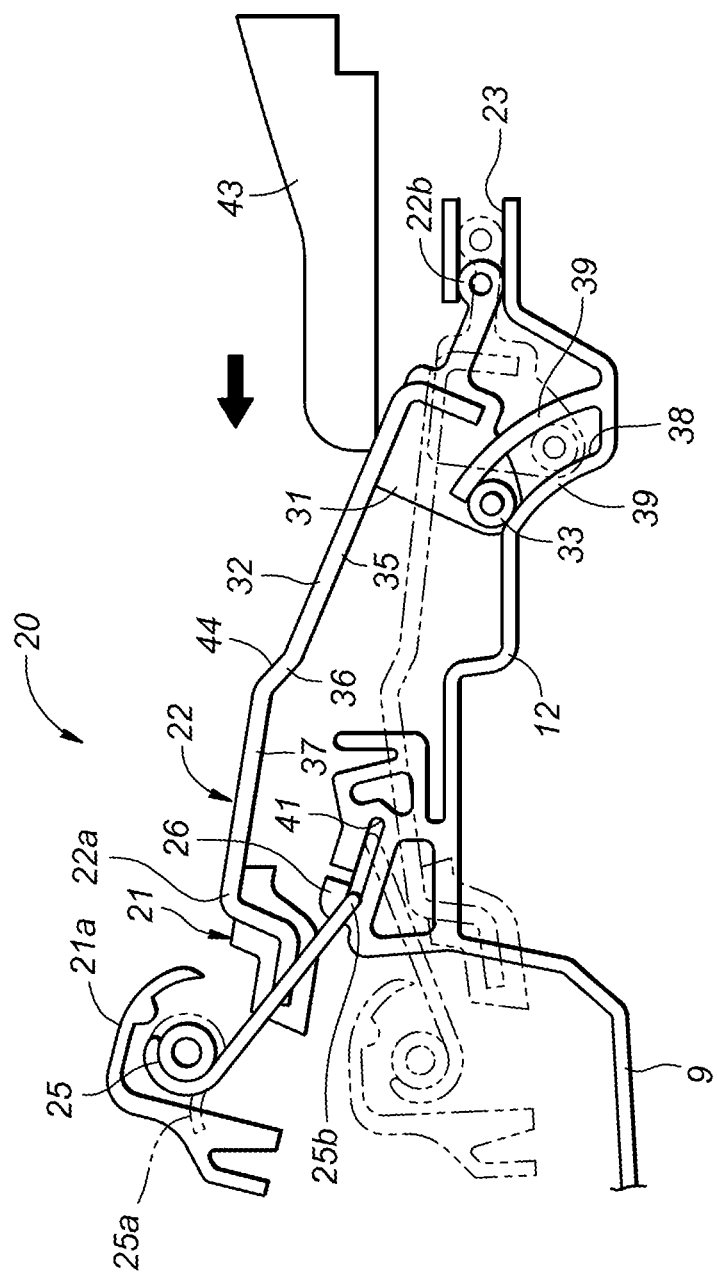
FIG. 6 is a side view schematically showing the deflector for explanation of the operation.

FIG. 5 is a side sectional view showing a deployed state of the deflector 20, and FIG. 6 is a side view schematically showing the deflector 20 for explanation of the operation. Note that in FIG. 6, a part where the blade 21 is coupled to the arm 22 and a part where the torsion coil spring 25 is held are shown by cross sections. In the deployed state shown in FIG. 5, the deflector 20 makes the blade 21 protrude upward from the opening 2 (see FIG. 1). The front member 9 of the sunroof frame 6 is formed with a cam groove 38 for guiding the cam pin 33. The cam groove 38 is defined by a pair of guide walls 39 integrally formed in the extension part 13 of the front member 9.

The guide walls 39 are disposed to be spaced from each other in the front-rear direction and form the cam groove 38 which is opened laterally (in the present embodiment, inward in the vehicle width direction). The cam groove 38 is inclined forward toward the upper end. Also, the cam groove 38 is curved in an arc shape that is convex rearward such that the upper part thereof has a larger forward inclination angle. The cam groove 38 is opened upward and forward at the upper end thereof. Thereby, when the arm 22 is assembled with the sunroof frame 6, the cam pin 33 can be easily inserted in the cam groove 38.

Also, the pair of guide walls 39 is disposed in a position lower than the lower surface of a part of the side member 8 around the through hole 24. In other words, the guide walls 39 do not protrude upward from the through hole 24 of the side member 8. Therefore, the guide walls 39 do not interfere with the slider supporting the slide panel 4. Thus, the slider can be disposed forward of the rear edge of the through hole 24, and the support stiffness of the slide panel 4 can be improved.

The support groove 23 formed in the front member 9 is opened rearward below the side member 8. Therefore, when molding the front member 9 with resin, it is easy to release the front member 9 from the mold, whereby the manufacturing cost of the front member 9 is reduced.

As shown in FIG. 6, the spring locking part 26 is formed with a guide groove 41 for guiding the other end 25b of the torsion coil spring 25 to be slidable in the front-rear direction. The guide groove 41 extends in the front-rear direction, and the upward movement of the blade 21 is restricted when the other end 25b of the torsion coil spring 25 is locked by the front edge of the guide groove 41. In other words, the part of the spring locking part 26 defining the front edge of the guide groove 41 locks the other end 25b of the torsion coil spring 25 to restrict the upward movement of the blade 21.

With the torsion coil spring 25 provided as described above, regardless of the trajectory of the blade 21 driven by the arm 22, it is possible to dispose the torsion coil spring 25 in a desired position of the blade 21. Also, since the upward movement of the blade 21 is restricted by the spring locking part 26 provided in the sunroof frame 6, there is no need to provide a member for pressing the arm 22 from above to restrict the movement. Therefore, an increase in the thickness of the sunroof device 5 is suppressed.

In the deployed state shown by solid lines in FIG. 6, the arm 22 assumes a posture in which the front end 22a is inclined upward at most, and the cam pin 33 is in the highest position within the movable range defined by the cam groove 38. Since the cam groove 38 is inclined forward toward the upper end as described above, the rear end 22b of the arm 22 is positioned most forward in the movable range in the front-rear direction.

As also shown in FIG. 5, in the deployed state of the deflector 20, the arm 22 passes through the through hole 24 of the side member 8 and extends to above the side member 8. Since the through hole 24 is formed, the front end of the side member 8 can extend forward of the rear end 22b of the arm 22. Thereby, an increase in size of the front member 9 is suppressed.

The support groove 23 is disposed rearward of the through hole 24, and due to this configuration, the side member 8 is present above the support groove 23. Therefore, the support stiffness of the arm 22 by the support groove 23 is improved.

As also shown in FIGS. 2 to 4, the cam groove 38 is disposed in a position aligned with the through hole 24 in plan view. Also, the upper end of the cam groove 38 is opened, as described above. Due to these configurations, the arm 22 can be easily assembled with the front member 9 in the state in which the side member 8 is assembled with the front member 9.

As shown in FIG. 6, in the deployed state of the deflector 20, the intermediate plate part 36 of the second member 32 is positioned higher than the lower surface of a slide member 43 provided at the front end of the support stay of the slide panel 4, and the rear end of the second member 32 is positioned below the lower surface of the slide member 43.

When the slide panel 4 is driven forward, the deflector 20 is driven to the stowed state shown by imaginary lines in FIG. 6. Specifically, the slide member 43 that slides forward integrally with the slide panel 4 slidably contacts the upper surface of the second member 32 of the arm 22 and pushes down the second member 32, whereby the blade 21, the arm 22, etc. move to a stowed position shown by imaginary lines in FIG. 6. In other words, the upper surface of the second member 32, more specifically, the upper surface of the rear plate part 35 and the intermediate plate part 36 of the second member 32, forms a cam surface 44 that pushes down the blade 21 along with the forward sliding movement of the slide panel 4.

When the blade 21, the arm 22, etc. move from the deployed position to the stowed position, the cam pin 33 moves downward in the cam groove 38. Since the cam groove 38 is inclined rearward toward the lower end, the arm 22 pivots in the direction to reduce the tilt angle while the rear end 22b moves rearward. In other words, the arm 22 pivots while moving in the front-rear direction. Therefore, compared to the case where the rear end 22b of the arm 22 does not move rearward, the blade 21 moves downward along a trajectory closer to a vertical trajectory. In the stowed state shown by imaginary lines in FIG. 6 in which the tilt angle of the arm 22 is the smallest, the rear end 22b of the arm 22 is positioned most rearward in the movable range in the front-rear direction.

In this way, the arm 22 which is coupled to the blade 21 at the front end 22a thereof is supported at the rear end 22b thereof to be movable in the front-rear direction in the cam groove 38 of the front member 9, and therefore, the arm 22 can pivot while moving in the front-rear direction.

In addition, in the present embodiment, the cam groove 38 for guiding the cam pin 33 is formed in the front member 9. Therefore, there is no need to mount another member for forming the cam groove 38 to the side member 8. In other words, mounting work of another member is unnecessary, and dimension management of another member in the mounted state is also unnecessary. Thus, the number of work steps of the deflector structure is reduced and the dimension management of the deflector structure is easy.

Note that since the rear end 22b of the arm 22 is supported to be movable in the front-rear direction and the cam pin 33 moves along the cam groove 38, the movement trajectory of the arm 22 is uniquely determined. And, when the arm 22 causes the blade 21 to protrude from and retract into the opening 2 along with the sliding movement of the slide panel 4, the rear end 22b moves in the front-rear direction. Since the rear end 22b of the arm 22 moves in the front-rear direction, it is possible to cause the blade 21 to protrude from and retract into the opening 2 along a near-vertical trajectory without making the arm 22 long.

Also, as described above, the support groove 23 for supporting the rear end 22b of the arm 22 is formed in the front member 9. Therefore, there is no need to mount another member to the side member 8 to form the support groove 23. Due to this also, mounting work of another member is unnecessary, and the dimension management of another member in the mounted state is unnecessary.

Concrete embodiments of the present invention have been described in the foregoing, but the present invention is not limited to the above embodiments and may be modified or altered in various ways. For example, instead of the through hole 24 formed in the front portion of the side member 8 of the sunroof frame 6, a notch extending rearward from the front edge of the side member 8 may be formed. With this configuration as well, the arm 22 can extend obliquely forward and upward from the rear end 22b thereof to pass through the notch so that the front end 22a is disposed above the sunroof frame 6.

In the above embodiment, the blade 21 is urged upward directly by the torsion coil spring 25, but the torsion coil spring 25 may urge the blade 21 indirectly. Also, the urging member for urging the blade 21 upward is not limited to the torsion coil spring 25. For example, an urging member such as a compression coil spring, a tension coil spring, a leaf spring, etc. may urge the arm 22 upward, thereby to urge the blade 21 indirectly.

In the above embodiment, description was made of the sunroof device 5 for an automobile as one example, but the present invention may be widely applied to a railroad vehicle, a watercraft, etc. Besides, the concrete structure, arrangement, number, material, angle, etc. of each member or part may be appropriately changed without departing from the spirit of the present invention. On the other hand, not all of the components shown in the above embodiment are necessarily indispensable and they may be selectively adopted as appropriate.

LIST OF REFERENCE NUMERALS 1 roof
2 opening
3 fixed roof
4 slide panel
5 sunroof device
6 sunroof frame
8 side member
9 front member
20 deflector
21 blade
22 arm
22b rear end
23 support groove
24 through hole
33 cam pin
38 cam groove
39 guide wall

The invention claimed is:
1. A deflector structure for a sunroof device, comprising:
a sunroof frame including a pair of side members that extend along both side edges of an opening formed in a fixed roof and a front member that is made of resin and extends along a front edge of the opening to connect front ends of the side members to each other; and a deflector including a blade provided along the front edge of the opening and a pair of arms extending rearward from both side portions of the blade and configured to cause the blade to protrude from and retract into the opening along with a sliding movement of a slide panel for opening and closing the opening, wherein each side member is mounted to an upper surface of the front member so as to overlap with the front member in plan view, and a through hole or a notch vertically penetrating the side member is formed in a front portion of the side member, and when the deflector is in a deployed state in which the blade protrudes upward from the opening, the arm extends through the through hole or the notch to above the side member.

2. The deflector structure for the sunroof device as claimed in claim 1, wherein a support groove for supporting a rear end of each arm is formed in the front member.

3. The deflector structure for the sunroof device as claimed in claim 2, wherein each arm includes a rear end supported by the sunroof frame to be movable in a front-rear direction and a cam pin formed in an intermediate portion in a longitudinal direction, and a cam groove for guiding each cam pin is formed in the front member.

4. The deflector structure for the sunroof device as claimed in claim 3, wherein the support groove is disposed rearward of the through hole or the notch.

5. The deflector structure for the sunroof device as claimed in claim 3, wherein the cam groove is disposed in a position aligned with the through hole or the notch in plan view, and an upper end of the cam groove is opened.

6. The deflector structure for the sunroof device as claimed in claim 3, wherein a pair of guide walls defining the cam groove is disposed in a position lower than a lower surface of a part of the side member around the through hole or the notch.

7. The deflector structure for the sunroof device as claimed in claim 3, wherein the support groove is opened rearward below the side member.

* * * * *